US012649266B2

(12) United States Patent
Schedlbauer et al.

(10) Patent No.: US 12,649,266 B2
(45) Date of Patent: Jun. 9, 2026

(54) METHOD AND DEVICE FOR PRODUCING AN EDGEFOLD

(71) Applicant: International Automotive Components Group GmbH, Duesseldorf (DE)

(72) Inventors: Andreas Josef Schedlbauer, Loitzendorf (DE); Christian Dublaski, Aholming (DE); Matthias Schwitz, Grafling (DE); Ilja Vavilin, Plattling (DE)

(73) Assignee: International Automotive Components Group North America, Inc., Southfield, MI (US)

( * ) Notice: Subject to any disclaimer, the term of this patent is extended or adjusted under 35 U.S.C. 154(b) by 344 days.

(21) Appl. No.: 17/698,444

(22) Filed: Mar. 18, 2022

(65) Prior Publication Data

US 2022/0203583 A1     Jun. 30, 2022

Related U.S. Application Data

(62) Division of application No. 16/163,015, filed on Oct. 17, 2018, now abandoned.

(30) Foreign Application Priority Data

Oct. 18, 2017     (DE) ..................... 10 2017 124 286.4

(51) Int. Cl.
B29C 63/16        (2006.01)
B29C 43/20        (2006.01)
(Continued)

(52) U.S. Cl.
CPC .............. B29C 43/36 (2013.01); B29C 43/20 (2013.01); B29C 43/203 (2013.01); B29C 63/16 (2013.01);
(Continued)

(58) Field of Classification Search
None
See application file for complete search history.

(56) References Cited

U.S. PATENT DOCUMENTS 4,584,038 A * 4/1986 Enders ................... B29D 30/32
                                                            156/401
5,139,604 A * 8/1992 Mitchell ................. B29C 63/16
                                                            100/211
(Continued)

FOREIGN PATENT DOCUMENTS

DE        3045898        10/1982
EP        0533311        3/1993
(Continued)

OTHER PUBLICATIONS

Partial European Search Report from corresponding Application No. 18195112.0, dated Feb. 14, 2019.
(Continued)

*Primary Examiner* — Abbas Rashid
*Assistant Examiner* — Caroline Beha
(74) *Attorney, Agent, or Firm* — Secant IP, PLLC; Steven J. Grossman

(57) ABSTRACT

A device for producing an edgefold on a component is suggested, wherein the component includes a support and a cover layer. The component may be an inner lining part of a motor vehicle, without limitation thereto. The device comprises an elastic body, which is set up to pull the cover layer over an edge of the support by deforming the elastic body.

13 Claims, 2 Drawing Sheets

Figures 7, 8:
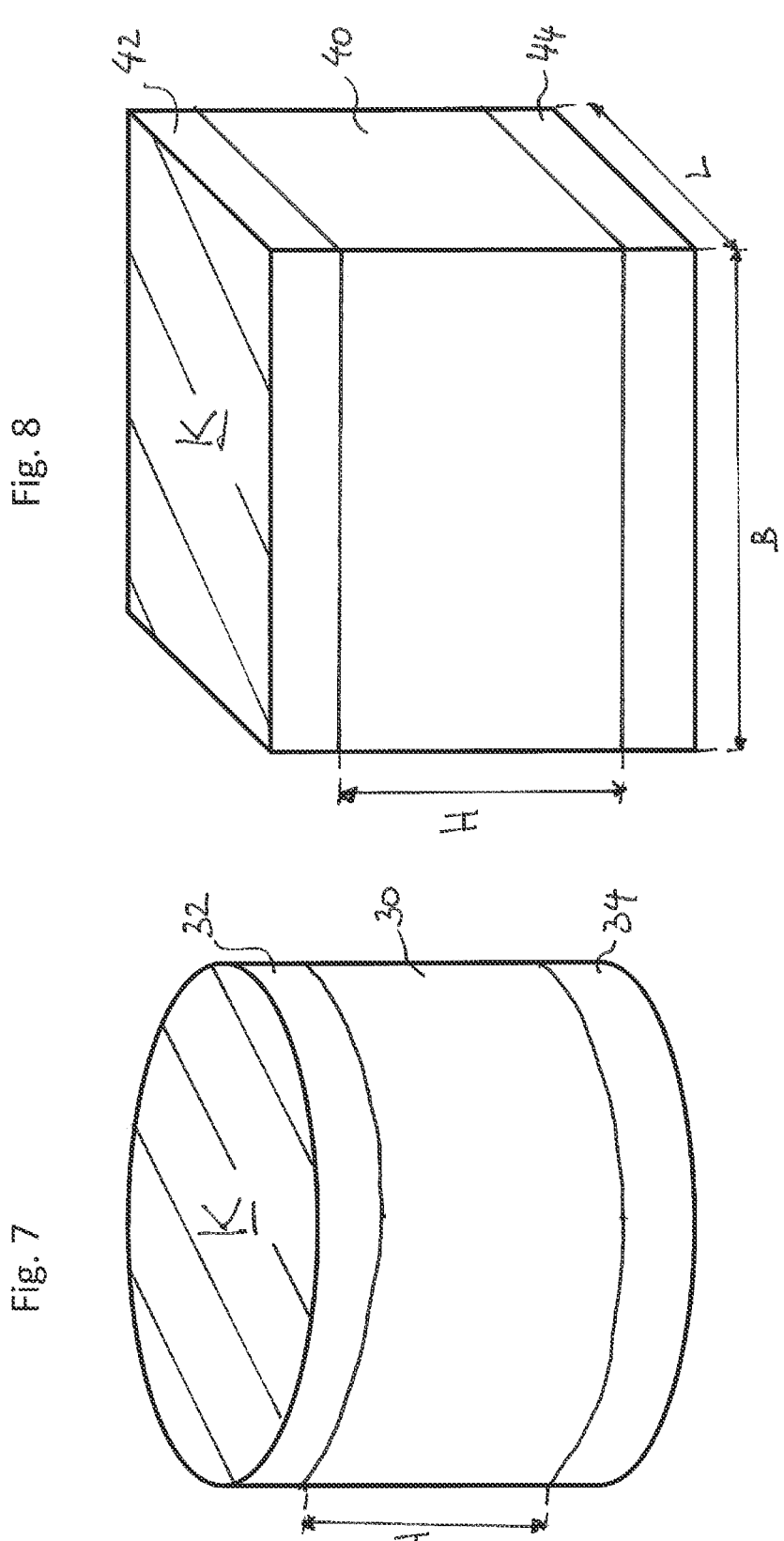

(51) Int. Cl.
  *B29C 43/36*       (2006.01)
  *B29L 31/30*       (2006.01)

(52) U.S. Cl.
  CPC . *B29C 2043/366* (2013.01); *B29L 2031/3005*
                                            (2013.01)

(56)                 References Cited

U.S. PATENT DOCUMENTS

| 5,151,236 | A | * | 9/1992 | Azzara | ................ B29C 67/0014 |
| | | | | | 264/315 |
| 2009/0151576 | A1 | | 6/2009 | Ito | |
| 2018/0015527 | A1 | * | 1/2018 | Maeda | ................... B21D 39/20 |

FOREIGN PATENT DOCUMENTS

| EP | 1106331 | | | 6/2001 | |
| EP | 1531036 | | | 5/2005 | |
| GB | 1288371 | A | * | 9/1972 | ............. A41H 33/00 |
| JP | 57098342 | A | * | 6/1982 | ........... B29C 53/025 |
| JP | H10327940 | | | 2/1991 | |

OTHER PUBLICATIONS

Extended European Search Report from corresponding Application
No. 18195112.0, dated May 13, 2019.

* cited by examiner

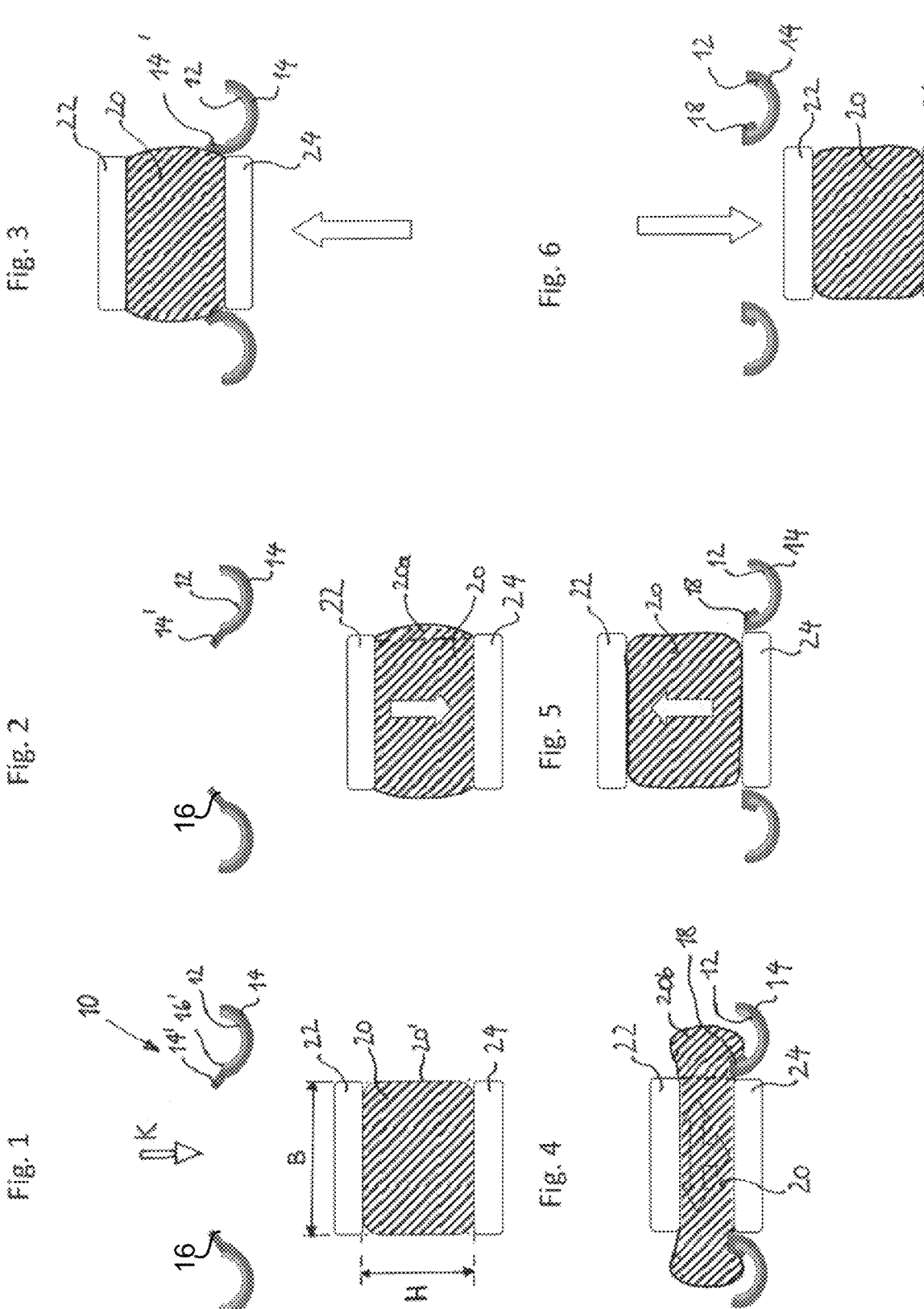

METHOD AND DEVICE FOR PRODUCING AN EDGEFOLD

The disclosure relates to a method and a device for producing an edgefold on a component, which includes a support and a cover layer. The component can for example be an inner lining part of a motor vehicle or a part thereof. This may also be a different type of decorative part or visible part e.g. of a furnishing.

Inner lining parts of motor vehicles are generally built with a relatively rigid support component, e.g. made from plastic or a composite material, such as a fibre composite material, which determines the contour of the inner lining part. The support component can be laminated with a cover layer, e.g. with a cover layer made from a textile fabric, such as a weaved or knitted material or knitted fabrics, made from smooth leather, suede or artificial leather, Alcantara or Dinamica®, microfibre material or from various types of plastic films. An intermediate layer, e.g. a foam layer or a spacer fibre layer, can be provided between the support component and the cover layer, or as a constituent of the cover layer.

In automotive technology, the visible side of the cover layer is termed the A side, the front side of the support component, which faces the cover layer, is termed the B side and the opposite rear side of the support component is termed the C side. The front side is basically the side facing the passenger compartment and the rear side is the side facing away from the passenger compartment.

Various cover layers, which are used in the production of inner lining parts, may be stretchable in the longitudinal and transverse directions and also have different extensibility in the longitudinal and transverse directions. As a result, it may be difficult during the lamination of the support component to apply the cover material evenly and without warping. If e.g. the cover layer has a structure and/or a pattern, the structure or the pattern on the surface of the inner lining part should be prevented from distorting in the region of edges and curves and being perceived in an irregular manner as a result. This is also true for outer edges and openings of the inner lining part, at which an edgefold is formed, at which the material of the cover layer is pulled, as smoothly as possible and without distortion, over the edge of the support component from the B side to the C side and fixed on the C side (rear side) of the support component.

In the prior art, metal sliders are used for the automated or semi-automated production of edgefolds, which metal sliders pull the cover material along the edge of the inner lining part to the rear side thereof and press the same against the rear side. One example of such a prior art is described in EP 0 533 311 A1. The metal sliders must in each case be adapted to the geometry of the component edge or an opening, at which an edgefold should be produced. There is the risk that the metal sliders damage the cover layer.

The laminating procedure may in practice be made even more difficult in that the inner lining part is generally heated in order to produce a connection to the cover layer. The heating may release injection stresses in support components, which are produced in an injection moulding process, as a result of which there may be a slight deformation of the support component, which cannot be compensated by the metal sliders or can only be compensated by position correction. The production of a high-quality edgefold, which is smooth, crease-free and free of warping or distortion of the cover layer, is therefore difficult to achieve in automated production methods. The reject rate is relatively high.

According to one aspect, a device for producing an edgefold on a component is provided, wherein the component includes a support and a cover layer. The component may be an inner lining part of a motor vehicle, without limitation thereto. The device comprises an elastic body, which is set up to pull the cover layer over an edge of the support by deforming the elastic body. Instead of the metal sliders which are known from the prior art, the elastic body is used for pulling and pressing the cover layer, which elastic body can be deformed in such a manner that the same forms a material bulge, which entrains the material of the cover layer when it is guided along the edge of the support component, and which can press the cover layer against the rear side of the support component. In this case, the elastic body can be deformed to different degrees, as required, during the production of the edgefold and adapt and conform to the shape of the edge and the rear side of the support.

The elastic body may include an elastomer, such as a vulcanizate of natural rubber or silicone rubber, or be produced from an elastomer. It may e.g. have a Shore A hardness of between 2 and 20, more specifically between 3 and 15. The hardness or elasticity of the body may be dependent on the stiffness or extensibility of the cover layer and the length of the edgefold to be produced.

In one example, the elastic body is clamped between two pressure plates, wherein the elastic body can be deformed by means of a relative movement of the two pressure plates. In plan view, the pressure plates can have the same or essentially the same contour as the elastic body in the relaxed state. Preferably, in plan view, the pressure plates have the same or an only slightly smaller perimeter than the elastic body. If the pressure plates are moved towards one another, the elastic body and the material of the elastic body can be pressed outwards beyond the periphery of the pressure plates and forms a material bulge, which can extend around the periphery of the elastic body on all sides. So, depending on the path, on which the pressure plates are moved towards one another, a material bulge is created, which extends outwards more or less further beyond the periphery of the pressure plates.

The device can include a pressing device for exerting pressure on two opposite surfaces of the elastic body, e.g. by means of the two pressure plates, for deforming the elastic body, and a clamping device for positioning the component relatively to the elastic body, wherein the pressing device and the clamping device are set up in such a manner that, when the elastic body is compressed and deformed, material of the elastic body forms a material bulge and is pressed in the direction of the component. If the thus deformed elastic body is moved past the edge of the support, the body can entrain the material of the cover layer from the front side of the support over the edge of the support and press the same in the direction of the rear side of the support. In order to press the cover layer against the rear side of the support, the elastic body can be compressed more strongly and thus form a further protruding material bulge, which conforms to the rear side of the support.

The device can therefore pull the cover layer, without creases, distortion or warping and without the inclusion of air, from the front side to the rear side of the support, over the edge and press the same against the rear side. On the rear side of the support, the cover layer can be fixed by means of an adhesive, e.g. a heat-activable adhesive or a different bonding agent.

The elastic body may, in the relaxed state, be at least approximately cuboidal, with a width B, a length L and a height H. The height H and the width B are illustrated in FIG. 1. The length extends perpendicularly to the drawing plane. The absolute dimensions of the elastic body may be dependent on the length of the edgefold to be produced and the stiffness of the cover material. The length L may for example lie in the order of magnitude of 10 mm≤L≤1 m and the width B and height H may lie e.g. in the order of magnitude of 5 mm≤B≤20 cm and 5 mm≤H≤10 cm. In an example, the relationship B/H may be approximately 2.

In a different example, the elastic body is at least approximately cylindrical in the relaxed state and the cylinder can have a maximum diameter D. The cylinder may have an oval, elliptic or round foot print and 5 mm≤D≤50 cm may apply for the maximum diameter. The height of the cylinder may be similar to that for the cuboidal body and for example lie in the order of magnitude of 5 mm≤H≤10 cm.

The elastic body may basically have a contour which is adapted to the contour of the edge of the component, at which the edgefold should be produced. The contour may have a straight, bent, angled, stepped, or other shape, in the plan view of the elastic body, corresponding to the contour of the edge, at which the edgefold is produced. The plan view onto the elastic body corresponds to the viewing direction onto the front side of the component, when the elastic body for producing the edgefold is positioned relatively to the component. The plan view onto the elastic body further corresponds to the viewing direction in accordance with the direction of the exertion of force onto the body.

In an example, the elastic body is used for producing an edgefold at an edge of an opening, which is constructed in the support, wherein the contour of the elastic body is adapted to the contour of the opening, wherein at least one dimension of the elastic body in the relaxed state, which lies in a plane parallel to the opening, is smaller by Δx than the corresponding dimension of the opening. For example: 0.5 mm≤Δx≤4 mm, more specifically 1 mm≤Δx≤2 mm. More specifically, a plurality of dimensions of the elastic body in the relaxed state, which lie in a plane parallel to the opening, are smaller by Δx than the corresponding dimensions of the opening.

The contour of the elastic body, in plan view, may correspond to the contour of the opening, along a part of the boundary or along the entire boundary of the opening. That is to say, it can have the same or essentially the same contour as the opening, but a little smaller in terms of diameter, e.g. smaller by 1 to 2 mm. As a result, it is possible to move the elastic body through the opening in a contact-free manner in the relaxed state, whilst the elastic body, when it is compressed and forms a material bulge which protrudes e.g. by 1 to 2 mm compared to the relaxed contour thereof, can be brought into contact with the edge of the opening. As a result, it is further possible to contact a cover layer over the entire periphery of the opening by means of the elastic body and to pull the same from the front side of the support to the rear side thereof. Subsequently, the elastic body can be deformed further, in order to form a larger material bulge, which presses the parts of the cover layer, which have been pulled through the opening to the rear side of the support, against the rear side of the support.

According to another aspect a method for producing an edgefold on a component is provided, the component having a support and a cover layer, the method comprising: positioning the component relatively to an elastic body, so that a boundary of the elastic body comes to lie next to an edge of the component on which the edgefold should be produced; and deforming the elastic body, so that material of the elastic body is pressed outwards in the direction of the edge and forms a material bulge and the material bulge pulls or pushes the cover layer from the front side of the support over the edge of the support and/or presses the same in the direction of the rear side of the support.

The elastic body can in a plane, which extends perpendicularly to the height thereof, centrally between the top surface thereof and base surface thereof, have a first cross-sectional area A1 in the relaxed state, have a second cross-sectional area A2 upon exertion of a first pressure P1, wherein a first material bulge protrudes from the top surface and the base surface by a first dimension B1, and have a third cross-sectional area A3 upon exertion of a second larger pressure P2, wherein a second material bulge protrudes from the top surface and the base surface by a second dimension B2, wherein A1<A2<A3 and wherein B1<B2. The first cross-sectional area A1 may correspond or essentially correspond to the contour of the top and base surfaces of the elastic body. The second cross-sectional area A2 may have a somewhat larger extent compared to the first cross-sectional area A1, e.g. laterally protrude all around the perimeter from the top and base surfaces by approximately 0.5 to 2 mm. And the third cross-sectional area A3 may be considerably larger than the first and the second cross-sectional areas and e.g. laterally protrude all around from the top and base surfaces by approximately 5 to 40 mm. The first material bulge may be dimensioned in such a manner that the material of the elastic body touches the edge of the support, in order to pull the cover layer from the front side of the support to the rear side thereof during movement of the elastic body along the edge. And the second material bulge can be dimensioned in such a manner that it expands over the edge of the support, in order to press the cover layer against the rear side of the support.

The elastic body can be clamped between two pressure plates, and the two pressure plates can be moved relative to one another for deforming the elastic body, wherein the pressure plates are initially set to a first spacing, in order to exert the first pressure P1 on the elastic body, and then the material bulge of the elastic body is moved from the front side, past the edge of the component in the direction of the rear side of the support, so that the material bulge pulls or pushes the cover layer along the edge of the component, from the front side of the support in the direction of the rear side of the support, and wherein the pressure plates are subsequently set to a second smaller distance, in order to exert the second pressure P2 on the elastic body, and the material bulge of the elastic body, forced outwards in the process, pulls or pushes the cover layer in the direction of the rear side of the support and presses the same against the rear side of the support.

In an example, the elastic body is configured for producing an edgefold at an edge of an opening, which is constructed in the support, and the contour of the elastic body is adapted to the contour of the opening, wherein the elastic body is guided at least to some extent through the opening, in order to pull the cover layer along the edge of the component from the front side of the support in the direction of the rear side of the support, and wherein the elastic body is deformed, in order to form a material bulge at a plurality of sides of the elastic body or at part of the periphery or the entire periphery of the elastic body, wherein the material bulge presses the cover layer along a part of the edge or along the entire edge of the opening in the direction of the rear side of the support.

The elastic body can be deformed prior to guiding through the opening, in order to form a first smaller material bulge, and can be relaxed after the pressing of the cover layer against the rear side of the support, in order to move the elastic body out of the opening, at which the edgefold was produced, without contact.

Examples are described in the following on the basis of an example, which relates to the production of an inner lining part of a motor vehicle, without any limited thereto.

The FIGS. 1 to 6 schematically show various stages of production of an edgefold with a device according to an example;

FIGS. 7 and 8 schematically show two different examples of an elastic body.

In the description, the same reference numbers are used for corresponding parts. To the extent that certain features are described in relation to one of the figures, this description also applies for the corresponding features in the other figures. Furthermore, the above description of various features and variations also applies for the further examples. A repetition of the features and variations should be dispensed with, so as to not make reading unnecessarily harder. For the sake of better clarity, a portion of the reference numbers are also omitted in a few figures. Nevertheless, the description of the features also applies for these figures.

In FIG. 1, an inner lining part 10 of a motor vehicle is illustrated schematically in section. In its simplest form, the inner lining part 10 comprises a relatively rigid support 12 and a cover layer 14. The support 12 may include a relatively rigid support component, e.g. made from plastic or a composite material, such as a fibre composite material, which determines the contour of the inner lining part. The support component can be laminated with a cover layer, e.g. with a cover layer made from a textile fabric, such as a weaved or knitted material or knitted fabrics, made from smooth leather, suede or artificial leather, Alcantara or Dinamica®, microfibre material or from various types of plastic films. An intermediate layer, e.g. a foam layer or a spacer fibre layer, can be provided between the support component and the cover layer, or as a constituent of the cover layer.

Without limitation thereof, it is assumed in the following example that the support is a plastic injection moulded part and that the cover layer is produced from leather, artificial leather or a cloth material. In FIG. 1, the inner lining part is illustrated with an opening 16, and at the opening boundary 16', the cover layer 14 has a protrusion 14' which is used for forming the edgefold. In the figures, the front side of the inner lining part 10 faces downwards and the rear side faces upwards.

In FIG. 1, an elastic body 20, also only termed body 20 in the following, is further illustrated in a sectional view. The body 20 is held between a top plate 22 and a base plate 24. FIG. 1 shows the elastic body 20 in the relaxed state when no pressure is exerted on the plates. The contour of the elastic body 20 and the two plates 22, 24 viewed from above in the drawing (see the arrow K in FIG. 1), corresponds to the contour of the opening 16, wherein the contour is somewhat smaller in terms of diameter (perpendicularly to the drawing plane of the figures), e.g. 1 to 2 mm smaller.

In this example, the height H of the body 20 (in the drawing plane; see FIG. 1) is between 3 and 6 cm, e.g. approximately 4 or 5 cm. The Shore A hardness is between 2 and 20, more specifically between 3 and 15, e.g. approximately 12.

FIGS. 7 and 8 schematically show two examples of elastic bodies 30 and 40, which are clamped between a top plate 32, 42 and a base plate 24, 34 in each case. The respective top surfaces of the bodies 30, 40 determine the contour K thereof, which can be adapted to the edge of the inner lining part or opening thereof. FIG. 8 shows a cuboidal body 40, wherein the height H, width B, and length L of the elastic body 40 are illustrated in the figure. FIG. 7 shows a cylindrical body 30, wherein the height H of the elastic body 30 is illustrated. Instead of the shapes shown, any desired other shapes adapted to the contour of the inner lining part or an opening thereof can be designed. The cylinder does not have to be a circular cylinder for example, but rather can have a freely shaped contour K. The cuboid may be varied not only in terms of the dimensions thereof, the side surfaces of the cuboid may also be modified as three-dimensionally shaped surfaces in accordance with the contour of the inner lining part or an opening thereof.

In a first processing step, which is shown in FIG. 1, the relaxed body 20 is aligned in such a manner that it is flush with the opening 16, or a boundary 20' of the body 20 is aligned to a boundary 16' of the opening (or to a different boundary of the inner lining part, if the edgefold is not formed at an opening). The positioning can take place in a positioning tool which is not shown.

In a further processing step, which is shown in FIG. 2, the top plate 22 and the base plate 24 are moved towards one another, so that the body 20 is slightly compressed and forms a first material bulge 20a, which protrudes by a few millimetres compared to the contour of the plates 22, 24, e.g. by 1 to 3 mm on all sides of the contour of the body 20. The first material bulge 20a is identified in FIG. 2 by means of a dashed line relatively to the rest of the body 20. The lateral extent of the body is thus enlarged in such a manner that the body no longer passes through the opening without contact. This state is termed a prestressed body 20 in the following. The plates 22, 24 can be compressed by means of an automatic pressing device.

In a next processing step, which is shown in FIG. 3, the prestressed body 20 is moved from the front side of the inner lining part 10 into the opening, wherein this can take place by moving the body 20 and/or the inner lining part 10. In this case, the first material bulge 20a comes into contact with the protruding part 14' of the cover layer 14 and pulls or pushes the same through the opening 16 and to the rear side of the support 12. Owing to the elasticity of the body 20, air and creases which may be present may be pressed or pulled out of the cover layer during this movement and the cover layer can be virtually ironed, so that it rests in a smooth and bubble-free manner on the opening edge 16'. During this processing step, the whole or essentially the whole body 20 can pass through the opening 16, so that at the end of the processing step, the lower edge of the elastic body 20, i.e. the boundary surface between the body 20 and the base plate 24 lies at the height or approximately at the height of the opening edge 16'.

In a subsequent processing step, which is shown in FIG. 4, the top plate 22 and the base plate 24 are moved further towards one another, so that the body 20 is more strongly compressed and forms a second material bulge 20b, which protrudes by a considerable amount compared to the contour of the plates 22, 24, e.g. by 10 to 25 mm or by approximately 20 mm on all sides of the contour of the body 20. The second material bulge 10b is identified in FIG. 4 by means of a dashed line relative to the rest of the body 20. The lateral extent of the body 20 is enlarged significantly as a result, and the body "bulges" forwards between the plates 22, 24, so that it presses against the protruding part 14' of the cover layer 14 and presses the same over the opening edge 16' away from the opening 16 and against the rear side of the support 12. This state is termed a pressed body 20 in the following. The plates 22, 24 can in turn be compressed by means of the automatic pressing device.

As a result, the pressed body 20 exerts a controlled pressure against the protruding part 14' of the cover layer 14 and the rear side of the support 12, which is used to connect the protruding part 14' of the cover layer 14 to the rear side of the support 12 and thus to produce the edgefold 18. Owing to the elasticity of the body 20, air and creases which may still be present may also be pressed or pulled out of the edgefold 14' of the cover layer 14 during this movement and the cover layer can be virtually ironed onto the rear side of the support, so that it rests in a smooth and bubble-free manner on the rear side of the support 12, in order to form the edgefold 18.

To produce a permanent connection, an adhesive can be applied in the region of the opening 16 onto the rear side of the support 12 and/or the protruding part 14' of the cover layer 14, or the same can be heated for activating an adhesive or an inherent adhesive action of the materials used, for example by means of the melting of thermoplastics.

Subsequently, as shown in FIG. 5, the elastic body 20 is relaxed, so that the contour thereof returns back to a periphery which is slightly smaller than the contour of the opening, so that the body can then be pulled out of the opening without contact, as shown in FIG. 6. As a result, any risk of the damage of the just produced edgefold 18 can be prevented.

In a variant, at the end of the processing step shown in FIG. 5, a laminating rim (not shown) can be applied onto the edgefold 18, in order to fix the edgefold 18 more strongly by applying additional pressure and/or additional heat.

An edgefold can also be produced in a similar manner at an outer boundary of a lining part.

What is claimed is:

1. A method to produce an edgefold on a component, which comprises a support and a cover layer, the method comprising:

providing a non-inflatable elastic body, providing the component, wherein the support has a front side and a back side and the cover layer is laminated to the front side of the support, wherein the support has an opening completely defined by an edge of the support and a recess in the back side surrounding the edge, and wherein the cover layer comprises a protrusion which overlies a portion of the opening defined by the edge of the support, deforming the non-inflatable elastic body, wherein the deforming of the non-inflatable elastic body forms a bulge in the non-inflatable elastic body which is passable through the opening, after the bulge is formed in the non-inflatable elastic body, moving the non-inflatable elastic body and/or the component relative to each other, wherein the bulge in the non-inflatable elastic body contacts the protrusion of the cover layer which overlies the portion of the opening and moves the protrusion towards the back side of the support, and the non-inflatable elastic body moves through the opening, as the non-inflatable elastic body and/or the component move relative to each other, after the bulge in the non-inflatable elastic body contacts the protrusion of the cover layer which overlies the portion of the opening and moves the protrusion towards the back side of the support, further deforming the non-inflatable elastic body, wherein the bulge in the non-inflatable elastic body increases and, as the bulge increases, the bulge further moves the protrusion towards the back side of the support wherein the protrusion enters the recess and contacts the back side of the support in the recess surrounding the edge wherein the protrusion forms the edgefold over the edge of the support defining the opening.

2. The method of claim 1, wherein moving the non-inflatable elastic body and/or the component relative to each other, wherein the bulge in the non-inflatable elastic body contacts the protrusion of the cover layer which overlies the portion of the opening and moves the protrusion towards the back side of the support as the non-inflatable elastic body and/or the component move relative to each other further comprises moving the non-inflatable elastic body relative to the component, wherein the bulge in the non-inflatable elastic body contacts the protrusion of the cover layer which overlies the portion of the opening and moves the protrusion towards the back side of the support as the non-inflatable elastic body moves relative to the component.

3. The method of claim 1, wherein moving the non-inflatable elastic body and/or the component relative to each other, wherein the bulge in the non-inflatable elastic body contacts the protrusion of the cover layer which overlies the portion of the opening and moves the protrusion towards the back side of the support as the non-inflatable elastic body and/or the component move relative to each other further comprises moving the non-inflatable elastic body relative to the opening, wherein the bulge in the non-inflatable elastic body contacts the protrusion of the cover layer which overlies the portion of the opening and moves the protrusion towards the back side of the support as the non-inflatable elastic body moves relative to the opening.

4. The method of claim 3, wherein moving the non-inflatable elastic body relative to the opening, wherein the bulge in the non-inflatable elastic body contacts the protrusion of the cover layer which overlies the portion of the opening and moves the protrusion towards the back side of the support as the non-inflatable elastic body moves relative to the opening further comprises moving the non-inflatable elastic body within the opening, wherein the bulge in the non-inflatable elastic body contacts the protrusion of the cover layer which overlies the portion of the opening and moves the protrusion towards the back side of the support as the non-inflatable elastic body moves within the opening.

5. The method of claim 1, further comprising relaxing the non-inflatable elastic body, after forming the edgefold, to eliminate or reduce the bulge in the non-inflatable elastic body wherein the non-inflatable elastic body is passable through the opening.

6. The method of claim 5, further comprising moving the non-inflatable elastic body, after relaxing the non-inflatable elastic body, through the opening without contacting the component.

7. The method of claim 1, wherein the back side of the support surrounding the opening and/or the protrusion which contacts the back side of the support surrounding the opening includes an adhesive which bonds the protrusion to the back side of the support.

8. The method of claim 7, wherein the adhesive bonds the protrusion to the back side of the support when the protrusion contacts the back side of the support.

9. The method of claim 1, wherein deforming the non-inflatable elastic body, wherein a bulge is formed in the non-inflatable elastic body is performed while the non-inflatable elastic body is positioned at the front side of the support remote from the opening.

10. The method of claim 9, further comprising moving the non-inflatable elastic body and/or the component relative to each other, wherein the non-inflatable elastic body occupies the opening.

11. The method of claim 1, wherein deforming the non-inflatable elastic body, wherein a bulge is formed in the non-inflatable elastic body further comprises compressing the non-inflatable elastic body in a compression direction, wherein the bulge is formed in the non-inflatable elastic body in a bulge direction which is transverse to the compression direction.

12. The method of claim 1, wherein the non-inflatable elastic body is arranged between two pressure plates, and the non-inflatable elastic body is deformed by a relative movement of at least one of the two pressure plates towards each other.

13. The method of claim 1, wherein the non-inflatable elastic body has a periphery and the bulge is formed completely around the periphery of the non-inflatable elastic body.

\* \* \* \* \*